US012792643B2

(12) United States Patent

Schiff et al.

(10) Patent No.: US 12,792,643 B2

(45) Date of Patent: Nov. 10, 2026

(54) COMPUTER-IMPLEMENTED ENGAGEMENT SYSTEM USING AN LLM MODULE FOR SELECTING TARGETS AND/OR MESSAGES TO TARGETS

(71) Applicant: Salesbot Labs, Inc., San Francisco, CA (US)

(72) Inventors: Jeremy Ryan Schiff, San Francisco, CA (US); Carlos Joel Espinoza Sanchez, Oakland, CA (US); Ricardo Augusto Rodrigues Gralhoz, San Jose, CA (US); Felix Flinders Sargent, San Francisco, CA (US); Brianne Tuesday Murphy, Berkeley, CA (US); Steven Erik Simunic, Emeryville, CA (US)

(73) Assignee: Salesbot Labs, Inc., San Francisco, CA (US)

( * ) Notice: Subject to any disclaimer, the term of this patent is extended or adjusted under 35 U.S.C. 154(b) by 0 days.

(21) Appl. No.: 19/041,204

(22) Filed: Jan. 30, 2025

(65) Prior Publication Data

US 2025/0245251 A1 Jul. 31, 2025

Related U.S. Application Data

(60) Provisional application No. 63/626,650, filed on Jan. 30, 2024.

(51) Int. Cl.

| | |
|---|---|
| ***G06F 16/00*** | (2019.01) |
| ***G06F 16/3329*** | (2025.01) |
| ***G06Q 10/1053*** | (2023.01) |
| ***G06Q 30/0251*** | (2023.01) |

(52) U.S. Cl.

CPC ..... *G06F 16/3329* (2019.01); *G06Q 10/1053* (2013.01); *G06Q 30/0251* (2013.01)

(58) Field of Classification Search

CPC ............ G06F 16/3329; G06Q 10/1053; G06Q 30/0251

USPC .......................................................... 707/706

See application file for complete search history.

(56) References Cited

U.S. PATENT DOCUMENTS

| | | | | |
|---|---|---|---|---|
| 10,013,701 B2 * | 7/2018 | Sterns | G06Q 30/0251 | |
| 10,318,982 B2 * | 6/2019 | Karande | G06Q 30/0242 | |
| 11,625,757 B1 * | 4/2023 | Hannebaum | G06Q 30/0271 | 705/14.66 |
| 2006/0047571 A1 * | 3/2006 | Garcia | G06Q 30/0267 | 705/14.66 |
| 2008/0082400 A1 * | 4/2008 | Martel | G06Q 30/02 | 705/14.42 |
| 2014/0180794 A1 * | 6/2014 | Merryman | G06Q 30/0256 | 705/14.54 |
| 2016/0358220 A1 * | 12/2016 | Kataria | G06Q 30/0255 | |
| 2017/0004531 A1 * | 1/2017 | Seetharama | G06Q 30/0256 | |
| 2018/0308133 A1 * | 10/2018 | Geist, Jr. | G06Q 30/0271 | |
| 2025/0086403 A1 * | 3/2025 | Pitkin | G06Q 30/0243 | |

* cited by examiner

*Primary Examiner* — Monica M Pyo

(74) *Attorney, Agent, or Firm* — Haynes and Boone, LLP

(57) ABSTRACT

A computer-implemented method of generating electronic communication messages to one or more target computer systems that comprises determining user inputs, using a large language model (LLM) module to generate a proposed search for the one or more target computer systems, prompting the LLM to modify the search based on certain criteria or user input, generating and sending proposed messages to the proposed set of targets.

18 Claims, 4 Drawing Sheets

COMPUTER-IMPLEMENTED ENGAGEMENT SYSTEM USING AN LLM MODULE FOR SELECTING TARGETS AND/OR MESSAGES TO TARGETS

CROSS-REFERENCE TO RELATED APPLICATIONS

The present disclosure claims priority to and the benefit of U.S. Provisional Patent Application No. 63/626,650, filed Jan. 30, 2024, which is incorporated by reference herein in its entirety.

FIELD

The present disclosure generally relates to engagement systems that seek to generate messages to send to computer systems associated with target recipients and that generates the messages to send, and more particularly to engagement systems that use an LLM module for generating targets and messages.

BACKGROUND

Engagement using a computer system might involve finding relevant people to engage with, reaching out to those people, and reviewing analytics to improve the process. One approach is to manually search a database of people using a platform and then either reaching out to the people through the same platform or getting contact information and manually reaching out to them. Many systems are very manual, with users iterating on simple searches using job titles, skills, locations, etc. and then reviewing people one by one, and adding them to a list of people to engage with. Users might email or call people one at a time. Users might not have any analytics, but if they do, they might be selecting content of their next message in an ad-hoc fashion, or by manually reviewing analytics to see which content of an email campaign generates the best messages.

SUMMARY

A computer-implemented method of generating electronic communication messages to one or more target computer systems might comprise determining user inputs, accessing a contacts database, using a large language model (LLM) module to generate proposed messages and a proposed set of targets associated with the one or more target computer systems, and sending the proposed messages to the proposed set of targets.

A system as described herein might provide for novel approaches to simplify and automate some or all of the current process of, and systems for, identifying a set of proposed targets to send proposed messages, such as for job interests, general engagement of people in conversation, and other uses.

A system according to the description herein might integrate existing proprietary systems as building blocks with third-party tools and use an LLM module to determine interactions with those building blocks to engage with people using target machines associated with those people. For example, the system might be used to search databases of people, company, activity, and/or contact information, then engage with them, and later determine effectiveness of a campaign, to improve processing over time. Some third-party information, such as real-time information or otherwise, could be used or synthesized.

The LLM module could be used in structured ways to generate plans for how to accomplish tasks after being provided with different tools and application programming interfaces (APIs).

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

There have been systems for generating engagement with the goal of getting conversations going for specific topics for many decades. Users have diverse goals that range from common and widespread such as sales, recruiting, and networking, to very niche such as identifying and engaging with expert witnesses for a legal proceeding.

Many existing systems only provide a subset of the functionality necessary for the entire process. Some systems only focus on finding people for recruiting purposes. Others only focus on finding contact data or reaching out to people. While the system described herein does not have to perform all of the tasks outlined and may just focus on a subset, the entire process and variations are used herein as examples, for clarity.

Using the systems described herein, higher level requests or descriptions can be used for automatic engagement based on other types of data, for instance, job descriptions on a career page. Once a first set of results is presented to the users, a user could login into a system and make requests to refine the results with natural language or provide other context such as a relevant website to generate further search criteria. In another embodiment, the LLM can proactively take steps on its own to refine the engagement, through pre-established parameters or iterative searches and re-validation before the results are presented to the user.

These engagement systems can satisfy a broad set of different goals for users. These include common problems such as engaging people to hire or engaging customers to sell to, to more niche things like lawyers engaging legal experts, investors contacting entrepreneurs, or business owners engaging new investors.

Many existing systems are rather simplistic and manual. If a user is looking for people to engage for recruiting, one way is to use narrow fields like job title or skills based on the information provided on a resume. If a user is looking to reach out to users they found through an email lookup service, they will just send emails one at a time, based on the contact information provided.

Instead, higher-level approaches synthesizing much more varied content than a query or an explicit email can be used to automate and simplify much of an outreach workflow, as explained herein.

Figure 1:
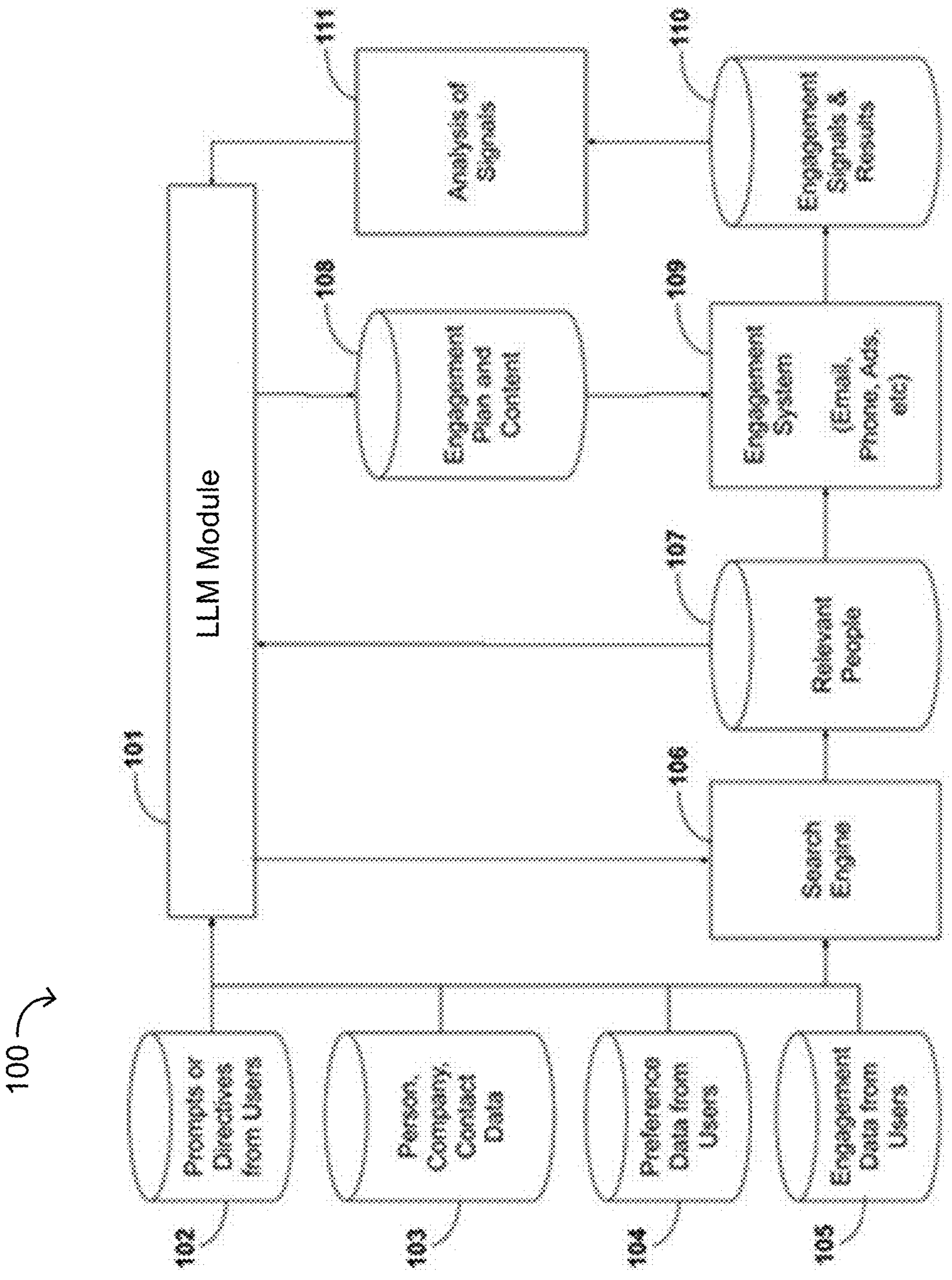
FIG. 1 is a block diagram of a computer system that might be used as part of a system for generating messages for target computer systems associated with persons and might include an LLM module, a search engine, an outreach engine, and a controlling module.

FIG. 1 is a block diagram of a computer system that might be used as part of a system for generating messages for target computer systems associated with persons and might include an LLM module, a search engine, an outreach engine, and a controlling module. The controlling module might be an optimization engine.

As illustrated, a system 100 might include an LLM module 101. LLM module 101 might perform discrete tasks and have a conceptual unit of work referred to herein as a "task prompt." A task prompt might involve converting a single request to a single response or might be reflected as an iterative request/response cycle. Task prompts can be pre-encoded by some application in a structured way, such as is described here for reaching out to people, or in a more open-ended way where LLM module 101 takes as input a high-level "objective prompt" from the user and generates task prompts from those, which may or may not require further user interaction.

Objective prompts are high-level requests or refinements. For example, an objective prompt might be represented by the string "Review my website and find and reach out to engineers that a user might want to interview for a potential role." In one embodiment, LLM module 101 receives an objective prompt from the user. LLM module 101 can then respond by, for example, (1) downloading and parsing the homepage of the website, (2) navigating to other pages via links on the website, (3) reading those key pages, (4) generating a job description for engineers that might be ideally suited to solve the problems described on the other pages, (5) using the job description to generate a search query for determining a proposed set of targets, (6) incorporating external media into the query such as information from competitor's websites, general news, private repositories such as a customer relations management (CRM) database, or cloud document storage, (7) running a search query to determine the proposed set of targets, (8) presenting the results to the controlling module so that the query can be modified by the user or by pre-set parameters, (9) running (if desired) a modified search query, and (10) presenting the results to the user.

In some cases, the objective prompts might be augmented with data. For instance, a prompt might be "Review my website and reach out to engineers that might want to interview for the potential role described in the job description," where the job description is provided as another input to LLM module 101 (as in step 5 above), such that the LLM module is configured to identify engineers from a subset of persons in the database.

As an alternative approach to using the objective prompts to generate task prompts, a user interface might present the user with a set of typical tasks (user interface prompts, or "UI prompts"), and just ask for inputs necessary for each of the task prompts but govern the steps via pre-determined steps software. For instance, this could be in the form of a more conventional UI asking for a list of information like a website homepage, key links, and a job description. Then the software can just run through the tasks step by step. While the prompts might be UI prompts, LLM module 101 might be a hybrid consisting of one or more LLM agents that accepts UI prompts and objective prompts depending on the circumstances. In such cases, the UI might be more loosely coupled to what happens next, for instance the UI may prompt a user to input additional information for clarification when trying to accomplish a specific task.

There can be many different types of input that can be provided to LLM module 101 beyond prompts from a user inputs database 102. Both objective prompts and UI prompts often integrate broad types of additional information. For the case of reaching out to people, many different facets are useful for segmenting out the relevant part of the population for engagement. A contact database 103 might include many different attributes for each person who might be added to a set of targets to contact. The attributes might include education, work experience, location, etc. In many professional contexts, information about companies can be used to enhance and allow new kinds of search parameters. Searching the contact database 103 for associated companies might involve leveraging data such as investment history, company descriptions, industry, and employee count as potential signals. Signals can provide a value, an action, and/or a statistic that can be used to extrapolate some property about the people in the set. Some signals might be purely just based on the data, and others are higher level concepts derived from the data through the LLM module 101. For instance, if the employee count is trending upward for a specific company the user is a part of, then this might be a signal that the company is a good sales target, and therefore the person associated with the company is a promising person to engage. From the generated query produced by the search engine, the controlling module may instruct the LLM module to perform recursive searches to refine and narrow the search results.

All of these types of data might not be explicit, but rather can be inferred and further enhanced by applying machine learning or generative artificial intelligence (AI) in the LLM module, or through user input to the LLM module via the communication module. Examples include inferring if a candidate is more likely to know specific technologies based on a company's tech stack, by analyzing user profiles to determine common traits between people at specific companies, determining if they are more likely to switch roles now based on their previous job history, etc. The signals may also be broader than static or binary signals, for instance, inferring if companies are growing or shrinking, and how employee count or funding is evolving over time. LLM module 101 can also process relevant data for each person and generate additional signals for use, either directly, or ingested by a search engine 106 as described herein.

A user preference database 104 might provide preference data about users and can also be integrated into the search performed. Preference data might include explicit or implicit ways the user can describe what they are looking for in a role. Examples of explicit data might include signals like users curating which people are relevant or not, or a "scale" of relevancy such as ratings data. For example, certain skills could be rated as higher relevance. Decisions could be narrow and specific such as a job position or listing; or could be broad and apply user or companywide. Other data might be more implicit, such as previous interview and hire data. For instance, data might be pulled from an ATS (Applicant Tracking System) in a recruiting context. Some of the explicit data might be in higher-level forms that are digestible by the LLM module. For example, a job description typically has useful data about what is important to a company for any specific role.

Reciprocally, there may be signals about potential interest from the people a company is interested in contacting, in an engagement history database 105, which might include user search history or intent signals for a marketing-qualified lead in a sales context. Examples include if that user has downloaded a whitepaper, clicked on an ad, subscribed to a newsletter, registered to a conference, joined a social media targeting group, channel, meetup group, interest group, etc. or even clicked on a link from a previous outbound campaign.

Some data may be direct inputs for an LLM module, such as a job description or recruiting specification in a recruiting context. However, in many contexts, especially those where real-time results are important, it might not be possible for an LLM to rapidly evaluate the relevant data without it being pre-indexed in different ways. For example, in common outreach scenarios where the system provides people from a database exceeding 100 million targets, a current LLM cannot simply read all that data in seconds and provide an output. One possible solution might be to have a system that has pre-indexed the sorts of questions that the LLM might want to inquire about, to find relevant people in seconds, rather than minutes or hours. This can be done using search engine 106 to obtain a set of proposed targets, as might be associated with individuals and be represented in a relevant persons database 107. Examples of this output from search engine 106 can go beyond just the raw people themselves, and can include signals like the number of people, the top attributes according to specific properties such as the most common job titles in the results, etc. The results provided by the search engine are directly filterable and modifiable by the user via the UI such that the user has control over the search results.

LLM module 101 might take many different inputs to interact with the search engine. Examples include job descriptions, task-based search prompts, or a step from a high-level LLM plan. Other inputs can also be used to dynamically change the prompts by interacting with a controlling module. For instance, if the initial query data object that LLM module 101 generates for the search engine is too narrow, and yields too few results, this information is analyzed by the communication module and passed from the communication module back into LLM module 101 with instructions for LLM module 101 to modify the search accordingly. Whether a query data object is too narrow can be determined by pre-set user parameters, or by the LLM module 101 itself based on information received by the search engine. Similarly, the controlling module might have code addressing specific scenarios explicitly executing or providing statistics to a user for making a decision if more refinement is needed. In some cases, how to proceed when an issue is detected may be unclear, in which case LLM module 101 can consult other APIs, other LLM subcomponents, or even ask for user input via the controlling module by showing the user the LLM's search strategy and allowing the user to adjust parameters or by prompting the user to provide a comment that is interpreted by the LLM to adjust the search. For instance, if there are too many people returned by the search engine, the controlling module can direct the LLM to refine the initial criteria from the user such as directing the LLM to focus on a set of industries or sizes of companies.

As illustrated in FIG. 1, there can be a feedback loop including LLM module 101 and search engine 106. This can be refined until acceptance criteria are met, until LLM module 101 determines that the result is acceptable, or until user preferences are met. For example, if acceptance criteria indicates that the outreach should find 100,000 targets, and the LLM's search only yields 50,000 targets, the LLM module can automatically modify the parameters of the search to increase the yield successively, until the acceptance criteria is met. Once the search is complete, the user is presented with the search results along with aspects of the LLM's search strategy, so the user can modify and iterate upon the search via the UI. Furthermore, the LLM module can process the contents of the results so the user can further filter and refine the results via the UI without the need to analyze each result for certain information.

Once relevant persons database 107 is populated with a set of proposed targets, a next step might be to determine how to interact with candidates represented by those proposed targets' records. The system can create, edit, or personalize outreach accordingly. Similar to using a search engine, this might be done by an LLM objective function, an LLM UI, or a hard coded list of explicit LLM tasks. In the case of an LLM objective function, the system might not only generate the content, but also the specific ways of contacting people. This could be generic across candidates, or on a per-person basis depending on the available data. More concretely, some age groups might be more likely to respond to one social network vs. another, or some might respond better to certain wording, use of emojis, tone, etc. The system can create a campaign from scratch and generate both a list of targets as well as the campaign content. The system can be used to edit a campaign, where a user encodes the framework, but the system fills in additional relevant content. For instance, a user can specify that they want to contact relevant persons via email only and have some number of emails per campaign, and have the system fill in the outreach content. A user may also use the system to personalize a campaign, where a user provides the system with a multi-email campaign but asks the LLM to enhance it by adding content, changing the tone, translating the language, or even adding new steps based on the targets or other metrics. These implementations can be executed with multiple LLM agents, such that one LLM agent may prompt another with feedback to create a recursive system to progressively modify results until they are in line with certain preferences.

A campaign set might be stored in an engagement database 108 for use in generating campaign outreach content, which might be multi-channel. For instance, the campaign might target a user via an ad for one month, then email them, and then finally have a phone conversation. The engagement database can be used in conjunction with the LLM module 101 and the controlling module to allow the user to make modifications to the campaign, by changing the frequency or type of communication through user input.

When determining how to create an outreach plan, some inputs might relate to the ways that specific people can be engaged. This type of data might be stored in contact database 103, allowing different ways to target people with messaging. For instance, if there is a certain subset of people the system is trying to get the user to talk to, then the system might want to understand what mechanisms are available. In some embodiments the targeted list does not actually come from a search query but is generated from people who indicate intent. For instance, the system could start by generating a display advertisement for social media, and then when those people engage with the ad, either put them through a funnel to collect contact information or leverage other signals like the knowledge between mapping of a social media user and an email, and then further engage with that person using automated email and phone outreach.

When generating the engagement plan for engagement database 108, the system can be high level such as telling a specific user to call the relevant person. It may also be much more prescriptive, for instance, generating the full content for emails as part of the outreach campaign. It can take as input any of the types of data enumerated from user inputs 102, contacts database 103, user preference database 104, and/or prior engagement database 105, or others not explicitly described. The system might perform outreach in a recruiting context and could use a job description. In another embodiment, the system can crawl and summarize the website of the sending company to generate domain-specific information based on images, text, video, etc. It can even integrate them together into an email by encoding them into a unified email encoded as HTML.

The system could perform an interactive text chat as a step in an outreach campaign, or even have the AI call the user by leveraging an LLM's conversational capabilities, coupled with text to speech and speech to text technologies.

As users or automated systems engage with people, it will often produce engagement results and other signals along the way to an engagement system 109, which tracks the tasks that have been completed, the tasks that need to be accomplished, the APIs necessary to accomplish these tasks, and the effectiveness of these tasks as measured by other signals. Examples of other signals are things like open or click through rates in emails, clicks from ads, or sentiment and tonality data from a phone call, etc. This engagement can then loop back into the LLM module which can execute an evaluation LLM allowing the process to be refined and experimented with over time. This creates a feedback loop between the communication module, LLM module, engagement system 109, and an engagement results database 110, where a user's input can direct the system to utilize certain kinds of communication based on engagement effectiveness. This allows the user to review the LLM module's search strategy and refine the search accordingly. For example, the system could generate three different email campaigns and then use A/B testing to see which one generates the most engagement. Then, the engagement signals could be provided back to LLM module 101 (or to the user), and the evaluation LLM could monitor for the most effective campaign, evaluate the signals, and generate new campaigns to try going forward. In another embodiment, the user could instruct the controlling module which campaigns to use, and the system could monitor these campaigns for effectiveness to decide which campaigns to utilize in the future.

The system can go even further and take the data from engagement results database 110 and analyze the signals using signal analyzer 111, and the feed it back to LLM module 101 to provide a new class of inputs about which people are responding most positively and using that as the system refines who to target and modifying the inputs to search engine 106. The analysis can be purely user driven, for instance looking at raw numbers, or results from A/B tests, semi-automated, or fully automated where the system uses the output of an evaluation framework like A/B testing or multi-armed bandit analysis to determine which tests were more effective, and by how much.

Figure 2:
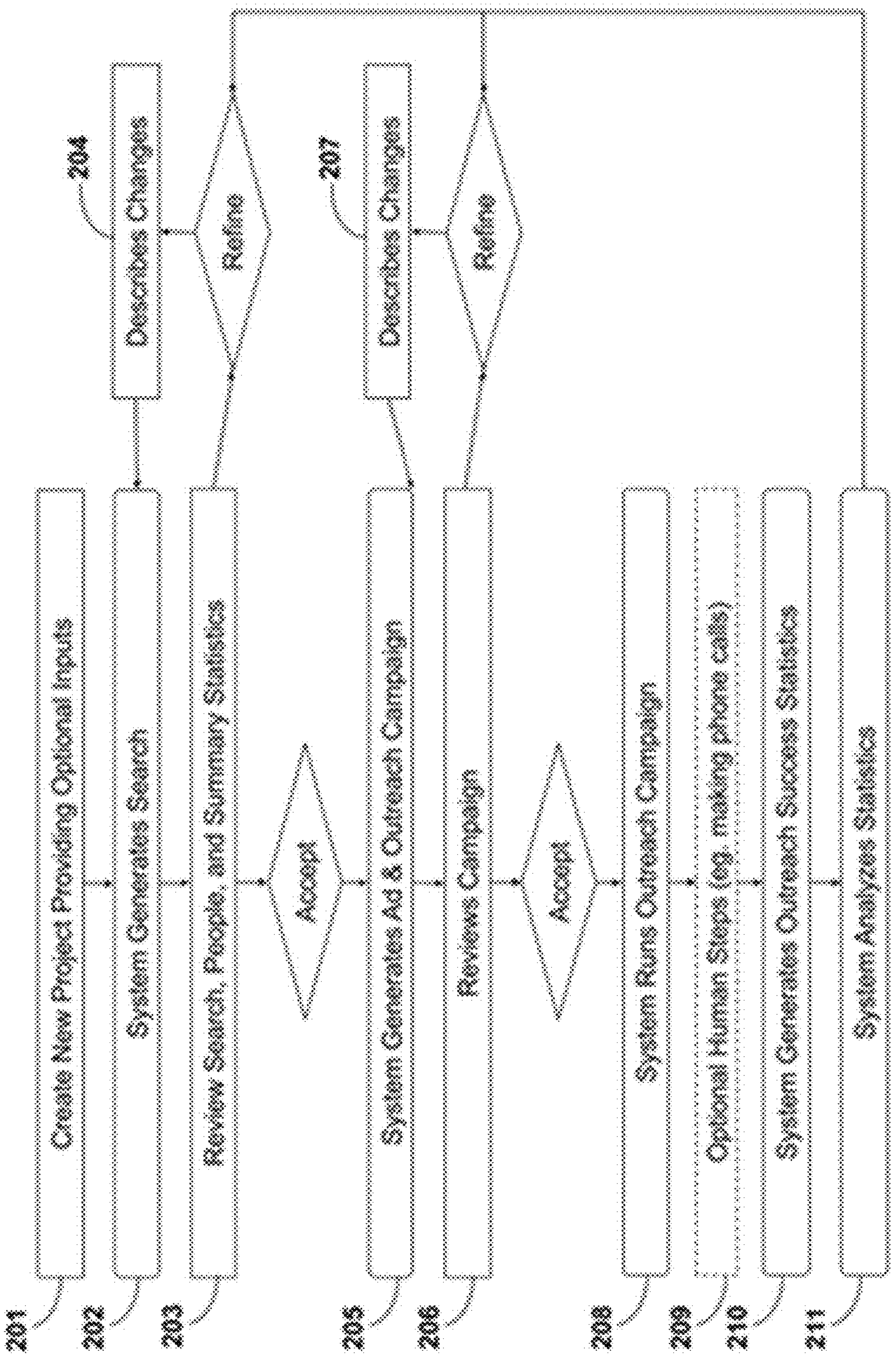
FIG. 2 is a flowchart of a process that might be used by a system for generating messages for target computer systems associated with persons and might include an LLM module, a search engine, an outreach engine, and a controlling module.

FIG. 2 is a flowchart of a process that might be used by a system for generating messages for target computer systems associated with persons and might include an LLM module, a search engine, an outreach engine, and a controlling module. FIG. 2 illustrates how an LLM module might interact with a system to engage new people. The process begins at step 201 by creating a new project for engaging people. A single company or use might have multiple projects depending on if multiple different tasks are to be employed, such as trying to sell two different projects, or if the same reason for engaging people is employed, but the segments are different, for instance small and enterprise clients to buy the same software package as the targeting and messaging would be different. The creation of the project could be a simple manual one where the user describes to an LLM module what they are looking to accomplish either in an Objective or UI prompt. The user might provide optional inputs, for instance a job description, or a set of users who had engaged with marketing material. A user might not actually manually create the project at all, for instance the system could monitor a website and create a new project automatically when a new job description appears on the website.

The system will then leverage the LLM module to accomplish a series of tasks to generate the search at step 202. Once the search query, people, and summary statistics have been generated at step 203, a user (or in other cases automatically for instance by using an LLM or other AI techniques like Generative Adversarial Networks (GAN) or others), the system can accept or refine the produced search. If the output is not acceptable, the controlling module or the user may articulate changes at step 204.

Once the system has a qualified segment of people to engage with, such as a set of proposed targets for a communication or message, the system might then generate the mechanisms to engage with those people. The system generates these different inbound and outbound elements involving approaches such as ads, videos on social media, emails, phone calls, etc., to encourage interaction from a target audience as illustrated at step 205. Similarly to step 203, we once again have the user, or the system review the campaign at step 206 and refine it as necessary, either automatically or manually at step 207.

After the people to engage are selected at step 206, and the campaign and its content is generated at step 208, the next step is to start running the campaign. This can work with many different tools or systems to generate ads, send personalized email campaigns, etc. There may be steps where humans need to participate in the campaigns, for instance making a phone call as in step 209.

As the leads trickle in, lead statistics become part of the campaign data record. Which statistics are available depends on how the system is built and integrated with other subsystems. For email, open and response rates are helpful, for ads it might be click through rates and conversion rates, at step 210. All of this information can influence the targets, and the campaign content. This refinement process can take the form of simply picking the best method to more sophisticated approaches such as A/B testing and multi-arm bandit formulations. Whatever the analysis, the campaign data record can be surfaced to the user or passed back into the system for further refinement by the controlling module. The system could generate new search queries from this information and content using task prompts, or it could generate larger form plans using objective prompts.

A one-sided engagement system or a two-sided marketplace interaction system might be implemented. For example, in a recruiting domain, the same approach might be used by companies to engage people, and by people to engage companies. Similarly in sales, salespeople might use the system to engage customers, and customers might use similar approaches to engage multiple vendors, for instance to get a better price or value.

In some embodiments, additional automation can be layered on top of an LLM subsystem. One extension might monitor content that the LLM uses to produce an outreach, and to make it possible to reach out automatically. In one such approach, the system could monitor the job descriptions created by a company, and automatically use the LLM system to determine the relevant people, and generate the relevant outreach, all without requiring human intervention. The LLM system may take action based on user input or based on detection of triggering events from external media. For example, the controlling module may instruct the LLM to monitor for triggering events such as a target company running ads, a LinkedIn update of a person changing companies, a post of a job description to a recruiting website, a "check-in" to a conference, a post to social media, etc. In some embodiments, the system begins creating a campaign as soon as it detects triggering events but allows users to make changes to the campaign content. In another embodiment, the system detects triggering events and provides a simple interface allowing the user to sign off on the outreach before it is sent. Regardless of the approach, the system and user can work hand in hand, whereby the user could override specific criteria used to find candidates, or the system could automatically explore alternative messaging and test whether that is more effective.

Figure 3:
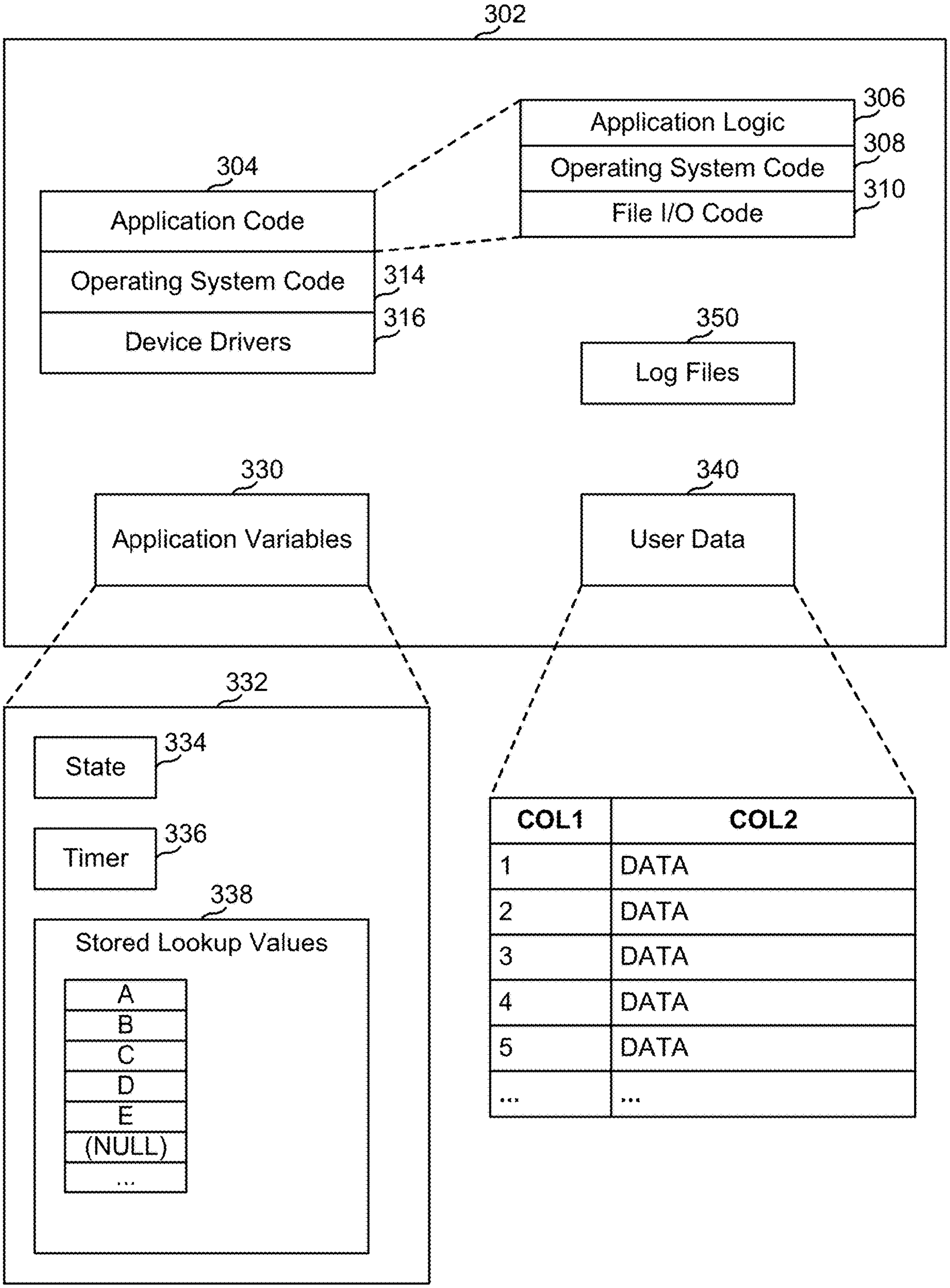
FIG. 3 illustrates an example computer system memory structure as might be used in performing methods described herein, according to various embodiments.

FIG. 3 is a simplified functional block diagram of a storage device 302 having an application that can be accessed and executed by a processor in a computer system as might be part of embodiments of an engagement system and/or a computer system that generates messages for targets. FIG. 3 also illustrates an example of memory elements that might be used by a processor to implement elements of the embodiments described herein. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network. For example, where a functional block is referenced, it might be implemented as program code stored in memory. The application can be one or more of the applications described herein, running on servers, clients or other platforms or devices and might represent memory of one of the clients and/or servers illustrated elsewhere.

Storage device 302 can be one or more memory device that can be accessed by a processor and storage device 302 can have stored thereon application code 304 that can be one or more processor readable instructions, in the form of write-only memory and/or writable memory. Application code 304 can include application logic 306, library functions 308, and file I/O functions code 310 associated with the application. The memory elements of FIG. 3 might be used for a server or computer that interfaces with a user, generates data, and/or manages other aspects of a process described herein. In addition to application code 304, storage device 302 might also contain operating system code 314 and device drivers 316.

Storage device 302 can also include storage for application variables 330 that can include one or more storage locations configured to receive variables 332. Application variables 330 can include variables that are generated by the application or otherwise local to the application, such as state variables 334, timers 336, and/or stored lookup values 338. Application variables 330 can be generated, for example, from data retrieved from an external source, such as a user or an external device or application. A processor can execute application code 304 to generate application variables 330 provided to storage device 302. Application variables 330 might include operational details needed to perform the functions described herein.

Storage device 302 can include storage for databases and other data described herein. One or more memory locations can be configured to store user data 340, which might include data sourced by an external source, such as a user or an external device. User data 340 can include, for example, records being passed between servers prior to being transmitted or after being received. Other data might also be supplied, such as a CRM or other cloud storage.

Storage device 302 can also include log files 350 having one or more storage locations configured to store results of the application or inputs provided to the application. For example, log files 350 can be configured to store a history of actions, alerts, error messages, and the like.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hardwired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

Figure 4:
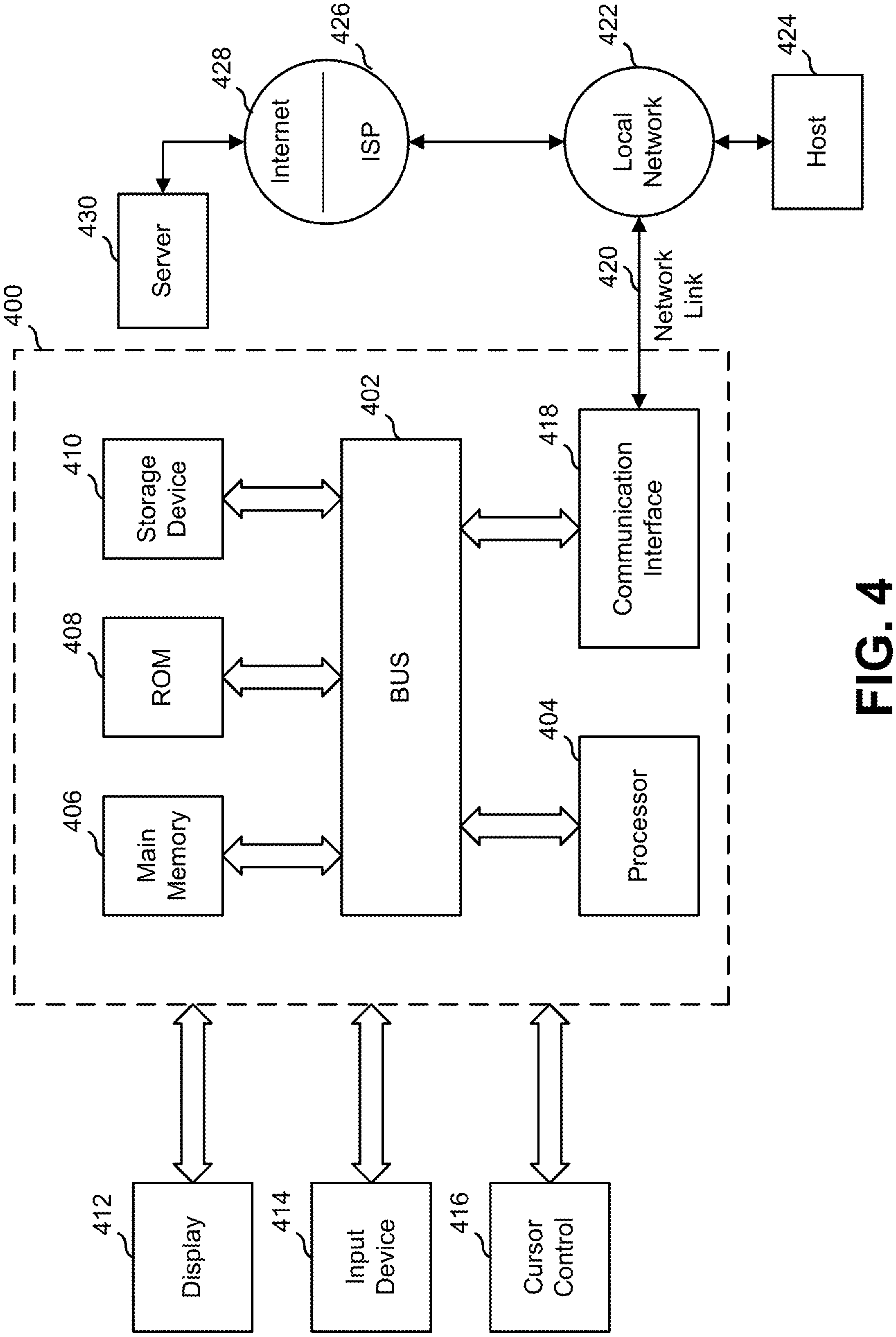
FIG. 4 is a block diagram illustrating an example computer system upon which the systems illustrated in FIGS. 1 and 3 may be implemented, according to various embodiments.

FIG. 4 is a block diagram that illustrates a computer system 400 upon which the computer systems of the systems described herein and/or data structures shown in FIG. 3 may be implemented. Computer system 400 includes a bus 402 or other communication mechanism for communicating information, and a processor 404 coupled with bus 402 for processing information. Processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 may also be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a computer monitor, for displaying information to a computer user. An input device 414, including alphanumeric and other keys, is coupled to bus 402 for communicating information and command selections to processor 404. Another type of user input device is a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more application-specific integrated circuits (ASICs) or field programmable gate arrays (FPGAs), firmware, and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a network connection. A modem or network interface local to computer system 400 can receive the data. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be a network card, a modem, a cable modem, or a satellite modem to provide a data communication connection to a corresponding type of telephone line or communications line. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420, and communication interface 418. In the Internet example, a server 430 might transmit a requested code for an application program through the Internet 428, ISP 426, local network 422, and communication interface 418. The received code may be executed by processor 404 as it is received, and/or stored in storage device 410, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention, and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating electronic communication messages to one or more target computer systems, the method comprising:

determining user inputs;

accessing a contacts database;

using a large language model (LLM) module to generate a query data object;

providing the query data object as an input to a search engine to generate a proposed set of targets associated with the one or more target computer systems;

generating, using the LLM module, a proposed campaign content dataset corresponding to the proposed set of targets;

evaluating, using the LLM module, the proposed set of targets and the proposed campaign content dataset against one or more acceptance criteria, wherein the one or more acceptance criteria comprise at least one of pre-set user parameters or a determination by the LLM module that the results are acceptable;

iteratively, using a controlling module and the LLM module:

(i) in response to the results not meeting the one or more acceptance criteria, directing, by the controlling module, the LLM module to modify one or more parameters of the query data object;

(ii) running the query data object as a query to the search engine; and (iii) refining the proposed set of targets and the proposed campaign content dataset until the one or more acceptance criteria are met;

providing the proposed campaign content dataset and the proposed set of targets to a user interface or an external computer system; and executing the proposed campaign content dataset to generate a set of messages to the proposed set of targets representing a corresponding campaign.

2. The computer-implemented method of claim 1, wherein the proposed set of targets are job candidates and the proposed campaign content dataset represents a hiring recruitment campaign.

3. The computer-implemented method of claim 1, wherein the proposed set of targets are members of an advertisement audience and the proposed campaign content dataset represents an advertising campaign.

4. The computer-implemented method of claim 1, further comprising using the controlling module to modify the query data object generated by the LLM module according to user input.

5. The computer-implemented method of claim 1, further comprising analyzing external media to refine the modified query data object generated by the LLM module.

6. The computer-implemented method of claim 1, further comprising determining a filter for the proposed set of targets and generating statistics of a filtered set of targets.

7. The computer-implemented method of claim 1, further comprising:

using target results and statistics to automatically refine the target results by modifying search criteria for relevant targets;

using the target results and the statistics to generate prompts for requesting feedback from a user; and refining the target results by changing the acceptance criteria for finding relevant targets, and/or by taking in an objective prompt and applying the objective prompt to the LLM module.

8. The computer-implemented method of claim 1, further comprising using the LLM module to generate inbound elements, generate marketing elements from media other than an objective prompt, and/or generate campaign content.

9. The computer-implemented method of claim 8, further comprising refining the target results based on user input to the LLM module by having the LLM module determine if the proposed set of targets meets the acceptance criteria, and if not, generating a prompt for a content-generating LLM module to refine its output until an evaluation LLM deems that the acceptance criteria is met.

10. The computer-implemented method of claim 1, further comprising generating a campaign data record.

11. The computer-implemented method of claim 10, further comprising:

collecting information about an efficacy of a campaign using campaign data record statistics, which comprise one or more of click through rates, conversion rates, open rates, and response rates; and modifying the proposed set of targets, and/or a campaign content dataset based on the efficacy of the campaign.

12. The computer-implemented method of claim 1, further comprising:

detecting a triggering event; and generating additional proposed campaigns for the campaign content dataset in response to the triggering event.

13. The computer-implemented method of claim 12, wherein the triggering event comprises changes to external media.

14. The computer-implemented method of claim 12, further comprising confirming with the user that a campaign should commence with specific targets and campaign content before initiating the campaign.

15. The computer-implemented method of claim 12, further comprising automatically sending a campaign on behalf of the user without asking for explicit permission.

16. The computer-implemented method of claim 12, further comprising:

receiving user interaction;

modifying the campaign based on the user interaction; and providing additional guidance as to targets and content.

17. The computer-implemented method of claim 12, further comprising dynamically changing the set of targets and/or the proposed campaigns based on the campaign data record statistics.

18. A non-transitory computer-readable storage medium storing instructions, which when executed by at least one processor of a computer system, causes the computer system to carry out method of claim 1.

* * * * *